United States Patent Office 3,153,070
Patented Oct. 13, 1964

3,153,070
DISULFONATE FATTY DIAMINE SALTS OF DICARBOXYLIC ACIDS
David B. Sheldahl, Griffith, Ind., assignor, by mesne assignments, to Sinclair Research, Inc., New York, N.Y., a corporation of Delaware
No Drawing. Original application Aug. 28, 1957, Ser. No. 680,661, now Patent No. 3,025,240, dated Mar. 13, 1962. Divided and this application June 12, 1961, Ser. No. 124,262
3 Claims. (Cl. 260—401)

This invention relates to new compositions of matter and more particularly to a new class of chemical compounds derived from the reaction of a dicarboxylic acid and a fatty diamine with an aromatic sulfonic acid. In other aspects this invention relates to novel compositions of matter and their use as a corrosion inhibitor in liquid mineral oils which normally come in contact with metals.

Various corrosion inhibitors have been suggested for use in liquid mineral oil bases for the protection of metal surfaces, both internal and external, which come in contact with the base oils. Many of these inhibitors when included in distillate fuels, for example, have proved disadvantageous inasmuch as films produced therefrom do not exhibit sufficient resistance to moisture, particularly under high humidity conditions. In many applications, as in diesel engine flushing fuels, for example, the base oil must be inhibited against corrosion under high humidity conditions and at the same time it is desirable, and in fact some specifications require, that the inhibitor be ashless.

In accordance with this invention I have found that corrosion problems occurring from mineral oils contacting metallic surfaces can be materially lessened through use of novel corrosion inhibitors prepared by reacting certain fatty diamines and dicarboxylic acids with an aromatic sulfonic acid. The inhibitor products are identified as disulfonate fatty diamine salts of dicarboxylic acids and as shown hereinafter, these reaction products have been found to exhibit marked protection of metal surfaces, particularly ferrous surfaces, which are in contact with liquid mineral oil products containing small amounts of moisture. When blended in mineral oil products such as gasoline and diesel fuel, such fuels easily pass humidity cabinet corrosion tests which thus indicates their resistance to moisture under high humidity conditions. The inhibitors give protection in static and dynamic systems, e.g. storage tanks and pipe lines, and effectively prevent corrosion without influencing basic characteristics of the mineral oil products in which they are incorporated. The novel inhibitor products of this invention are further advantageous in that they will not form a combustion ash upon being subjected to relatively high temperatures.

The corrosion inhibiting compositions of this invention are formed by adding to a suitable mineral oil base a compound or mixture of compounds having the formula:

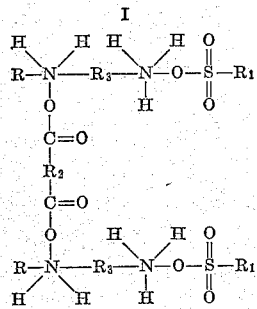

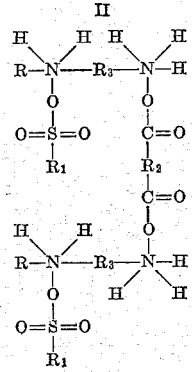

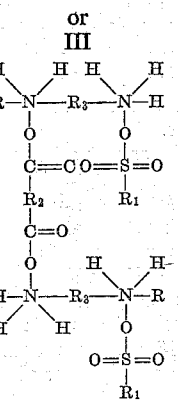

in which R represents a monovalent hydrocarbon radical containing from about 6 to 22 carbon atoms; $R_1$ is an aromatic radical or residue derived from aromatic sulfonic acids; $R_2$ in a divalent hydrocarbon radical of a dicarboxylic acid containing from about 0 to 36 carbon atoms; and $R_3$ represents a divalent aliphatic hydrocarbon radical containing from about 2 to 8 carbon atoms. Each of the groups R, $R_2$ and $R_3$ may be saturated or unsaturated, alike or different, straight chain or branched chain, are preferably straight chain, and may contain substituent groups such as amino, halogen, hydroxy, nitrile and the like.

The corrosion inhibiting compounds of the invention are identified as disulfonate fatty diamine salts of dicarboxylic acids and are mineral oil-compatible; that is, the compounds are dispersible, soluble or miscible without continuing agitation. The novel compounds are easily prepared, for example, by reacting an aromatic sulfonic acid and dicarboxylic acid in stoichiometric amounts with the fatty diamine. If desired, more than the stoichiometric amount of reactants may be used and the excess can be included with the principal corrosion inhibiting salt when added to the mineral oil base. The stoichiometric amounts of the reactants are approximately 2 moles of the fatty diamine to 2 moles of the sulfonic acid to 1 mole of the dicarboxylic acid. The reaction is almost instantaneous if carried out at temperatures between about 100 and 120° F. but will occur slowly at room temperature. Higher temperatures below the decomposition point of the reactants or product may be employed and the reaction can be carried out in the presence of a solvent. No special equipment is required and any suitable pot type reactor can be employed. In addition to the reaction product containing one to three of the compounds of Formulae I, II and III, other materials may be formed in the reaction and included in the corrosion inhibitor.

The fatty diamines which are used in accordance with the invention are represented by the following general formula:

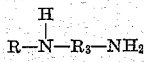

in which R is a hydrocarbon group containing at least about 6 and preferably 12 to 22 carbon atoms and $R_3$ is as described above. Preferably $R_3$ is a polymethylene group of about 2 to 8 carbon atoms and advantageously about 2 to 4 carbon atoms. The members of this class of diamine compounds are cationic and possess one primary and secondary amine group. The R group in the above formula may be straight or branched chain, or alicyclic, may contain substituent groups such as halogen, amino, hydroxy, nitrile, and the like, and is preferably an aliphatic carboxylic acid residue of high molecular weight fatty acids, either saturated or unsaturated. Examples of such acids are oleic acid, stearic acid, palmitic acid, linoleic acid, linolenic acid, ricinoleic acid, monohydroxy stearic acid, lauric acid, high molecular weight naphthenic acids, fatty acids obtained from the oxidation of petroleum waxes, and the like. Fatty acids which are particularly desirable for providing the carboxylic acid residue can be obtained from vegetable oils and animal fats such as soybean oil, coconut oil, lard oil, corn oil, castor oil, tallow, and the like. Other suitable carboxylic acid residues having the desired number of carbon atoms are the acids obtained from tall oil which contains a mixture of fatty acids and resin acids.

The fatty diamines can be prepared by reacting a polyalkylene diamine containing the desired number of methylene groups with an aliphatic or alicyclic chloride containing about 6 to 22 carbon atoms. The R group bonded to one of the nitrogen atoms is preferably an alkyl or alkylene radical derived from fatty acids obtained from fats and oil, such as corn oil or tallow, which provide a saturated and unsaturated aliphatic hydrocarbon group of from about 16 to 18 carbon atoms. Other methods of preparation which are satisfactory include reaction of the desired fatty acid with ammonia to obtain the corresponding amide. The amide is then reacted twice with acrylonitrile with each reaction being followed by hydrogenation to produce the final fatty diamine product.

An example of a preferred fatty diamine used in the preparation of the corrosion inhibitors of this invention is a commercial product designated as "Duomeen T" which corresponds to the above fatty diamine formula in which $R_3$ is trimethylene and R is the straight chain hydrocarbon radical derived from tallow fatty acids and having about 16 to 18 carbon atoms, saturated and unsaturated. These materials are well known, being marketed by Armour and Company, and are described in U.S. Patent 2,736,658.

The dicarboxylic acids used in the invention are of the general formula $R_2(COOH)_2$ wherein $R_2$ is a divalent hydrocarbon radical containing from about 0 to 36 carbon atoms. The useful acids have a molecular weight of up to about 600 and include, among others, such saturated dibasic acids as malonic, azelaic, oxalic, succinic, glutaric, adipic, suberic and pimelic, as well as the unsaturated acids, fumaric, maleic and glutaconic. These acids may be substituted or unsubstituted and for the most part selection of a useful dicarboxylic acid will depend upon cost and convenience of manufacture. Other dicarboxylic acid materials which can be employed are the propylene polymer adducts of succinic acid anhydride. When this material is reacted with the fatty diamine and aromatic sulfonic acids the reaction product includes a mixture of compounds rather than a single compound.

A particularly suitable dicarboxylic acid employed in this invention is dimerized ricinoleic acid, a dimer by definition being the product obtained when two molecules of a monocarboxylic acid condense to form a dicarboxylic acid. A source of the dimerized ricinoleic acid used in this invention is the still residue obtained in the dry distillation of castor oil carried out in the presence of sodium hydroxide. This material is well known and is described in U.S. Patent No. 2,632,695. The commercially available materials seldom contain 100% dimeric acid and accordingly the useful acids contain a predominant amount of dimerized ricinoleic acid together with small amounts of trimeric and higher polymeric acids, monocarboxylic acids, and unpolymerized fatty acids derived from the caster oil.

The sulfonic acid materials which can be used in the preparation of the corrosion inhibitors of this invention are the aromatic sulfonic acids including those derived from petroleum products. The useful petroleum sulfonic acids thus include the water-soluble or water-dispersible green acids and the preferentially oil-soluble acids referred to as mahogany acids. The green acids are found in the acid sludge resulting from the treatment of a suitable petroleum oil, such as a liquid petroleum distillate boiling in the range of 600 to 1000° F., with fuming sulfuric acid or sulfur trioxide, and are in fact mixtures of water-soluble sulfonic acids known as black acids, intermediate detergent-type sulfonic acids, and oil-soluble sulfonic acids called brown acids. The green acids are hydrophilic in character and can be recovered from the acid sludge by adding water to the sludge to dilute the sulfuric acid therein to a concentration of about 20 to 30%, at which concentration the green acids separate to form the supernatant layer, or they can be extracted from the sludge by using water-soluble solvents. The mahogany acids, some of which show limited hydrophilic properties, are oil-soluble or hydrophobic by nature and can be recovered from the acid treated oil or obtained as a concentrate in the acid oil varying from 10 to 50% by weight. The useful mahogany acids generally have a molecular weight of from about 300 to 500, or more, and although their exact chemical structures may vary, it appears that such acids are composed to a large extent of sulfonated aromatic hydrocarbons having either one or two aromatic rings per molecule possibly with one or more long chain alkyl groups containing from about 8 to 30 carbon atoms attached to the ring nuclei.

Suitable sulfonic acids which include both the oil and water-soluble petroleum sulfonic acids are the aryl sulfonic acids, benzene sulfonic acids, cymene sulfonic acid, naphthalene sulfonic acid, alkylated naphthalene sulfonic acid, fatty sulfonic and fatty aromatic sulfonic acids. Other useful aromatic sulfonic acids are the oil-soluble ammonia neutralized sulfonated mixtures of polyalkylated benzenes; alkyl aryl sulfonic acids in which the alkyl chain contains from about 8 to 18 carbon atoms; synthetic sulfonic acids prepared by reaction of paraffin wax chains of 20 or more carbons with aromatic nuclei which are sulfonated by fuming sulfuric acid, e.g. wax substituted naphthalene; ammonium mahogany sulfonic acids obtained by reaction of ammonia with sulfuric acid treated hydrocarbon oils, ammonium sulfonates of the alkyl aryl sulfonic acids, particularly those having a monocyclic nucleus; all of which are available or may be readily prepared by known methods. Particularly suitable sulfonic acid materials are ammonia neutralized sulfonated Neolene bottoms described in U.S. Patent No. 2,671,757 to T. G. Wisherd, and the ammonium mahogany sulfonates described in U.S. Patent No. 2,632,694 to F. M. Watkins. The aromatic oil-soluble sulfonic acids are conveniently employed as a concentrate in the oil from which they are derived and are usually present as a 10 to 30 weight percent concentration.

In a preferred embodiment of this invention the fatty diamine "Duomeen T" is reacted with petroleum sulfonic acids and dicarboxylic acids such as azelaic acid, the propylene polymer adduct of succinic acid anhydride, or the dimerized ricinoleic acid obtained from the distillation of castor oil. The reaction products may be obtained, for example, by first reacting the fatty diamine with the dicarboxylic acid in stoichiometric amounts, forming the fatty diamine dicarboxylate salts, followed by reaction of the salt with the aromatic sulfonic acids. Alternatively, the corrosion inhibiting compounds can be prepared by reacting together a mixture of the fatty diamine, the dicarboxylic acid and the sulfonic acids. The preferred aromatic sulfonic acids are the preferentially oil-soluble sulfonic acids, referred to as mahogany acids, which are employed as a 10 to 50% concentrate in the oil from which they are derived. Other preferred sulfonic acid materials are the ammonium mahogany sulfonates described in U.S. Patent 2,632,694.

The disulfonate fatty diamine salts of dicarboxylic acids of this invention are effective in liquid petroleum hydrocarbons such as light distillates, i.e. liquid hydrocarbons boiling up to and including gas oils, and lubicating oils. As examples they can be employed in gasoline, kerosene, petroleum solvents, diesel fuels, heating oils, neutral oils, etc. The amount employed in a given instance will depend upon the character of the base oil and the degree of corrosion inhibition desired with a small but sufficient amount being employed to give substantial corrosion inhibition. Generally, the inhibitor will comprise from about 0.001 to 5.0 weight percent or more of the total composition with larger amounts being used as the specific gravity or viscosity of the base oil increases. As examples, with gasoline the amount of inhibitor will vary generally from about 0.001 to 2 weight percent of the total composition including the base oil with about 0.5 to 2% being particularly useful for humidity cabinet protection. On the same basis about 0.001 to 3 weight percent of inhibitor would normally be used in diesel fuel with about 0.75 to 3% being preferred for flushing compositions. The corrosion inhibitors of the present invention may be used alone or in combination with other additives such as anti-foam agents, detergent additives, pour depressants, viscosity index improvers, etc., which improve the composition in one or more respects. Since the mineral oil is present in relatively large and major amounts the optimum concentration of any combination of additives will, of course, depend upon the particular type of mineral oil base stock and the potency of the additive combination contained therein.

The following specific examples serve to illustrate the invention but are not to be considered as limiting.

In Example I a monocarboxylic acid was reacted with "Duomeen T" and mahogany sulfonic acids to obtain a fatty diamine monosulfonate-monocarboxylate reaction product used for purposes of comparison.

EXAMPLE I 15.5 parts by weight of a commercially available fatty diamine salt of oleic acid identified as "Duomeen T mono-oleate," a proprietary product of Armour & Co., was reacted with 84.5 parts by weight of mahogany sulfonic acids (10% solution in its base petroleum oil; 300 SUS at 100° F., Acid No. 16.4). The reaction was carried out at a temperature of about 100 to 120° F. and a clear homogeneous solution resulted which was a 28% concentrate of fatty diamine mono-oleate monosulfonate. The monocarboxylate-monosulfonate product had the following properties:

| | |
|---|---|
| Gravity, API | 28.7 |
| Viscosity SUS at 100° F. | 451 |
| Viscosity SUS at 210° F. | 60.5 |
| Flash, ° F. | 350 |
| Fire, ° F. | 410 |
| Pour, ° F. | −35 |
| Color, NPA | 7— |
| Acid number | 26.5 |
| Saponification number | 26.4 |
| Nitrogen, percent | .69 |
| Sulfur, percent | .81 |

EXAMPLE II 7 parts by weight of "Duomeen T" and 5.8 parts by weight of dimerized ricinoleic acid were reacted with 87.2 parts by weight of mahogany sulfonic acids (same as employed in Example I). The reaction was effected at a temperature of about 100 to 120° F. and a clear homogeneous solution resulted which was a 21% concentrate of the fatty diamine dicarboxylate disulfonate. The solution had the following properties:

| | |
|---|---|
| Gravity, API | 22.4 |
| Viscosity SUS at 100° F. | 1721 |
| Viscosity SUS at 210° F. | 98.2 |
| Flash, ° F. | 375 |
| Fire, ° F. | 425 |
| Pour, ° F. | −10 |
| Color, NPA | Dk |
| Acid number | 25.6 |
| Saponification number | 26.8 |
| Nitrogen, percent | 0.77 |
| Sulfur, percent | 0.83 |

EXAMPLE III 10.5 parts by weight of "Duomeen T" and 2 parts by weight of azelaic acid were reacted with 87.5 parts by weight of the mahogany sulfonic acids used in Example I. The reaction was carried out at a temperature between about 100 to 120° F. and a clear homogeneous solution resulted which was a 21% concentrate of fatty diamine dicarboxylate-disulfonate. The solution had the following properties:

| | |
|---|---|
| Gravity, API | 21.9 |
| Viscosity SUS at 100° F. | 1481 |
| Viscosity SUS at 210° F. | 104.6 |
| Flash, ° F. | 375 |
| Fire, ° F. | 420 |
| Pour, ° F. | −20 |
| Color, NPA | 8— |
| Acid number | 38 |
| Saponification number | 38.6 |
| Nitrogen, percent | 0.81 |
| Sulfur, percent | 0.83 |

EXAMPLE IV 10 parts by weight of "Duomeen T" and 4.5 parts by weight of the propylene tetramer adduct of succinic anhydride were reacted with 85.5 parts by weight of the mahogany sulfonic acids of Example I. The reaction was carried out at a temperature of about 100 to 210° F. A clear solution of disulfonate fatty diamine dicarboxylate resulted which contained a mixture of amine sulfonate carboxyamino, carboxy amide, amino amide, carboxy amidesulfonic, and carboxy-amino-sulfonic soap of the succinic acid anhydride. The reaction product was a 21% concentrate in the mineral oil. The solution had the following properties:

| | |
|---|---|
| Gravity, API | 22.3 |
| Viscosity SUS at 100° F. | 567 |
| Viscosity SUS at 210° F. | 65.2 |
| Flash, ° F. | 380 |
| Fire, ° F. | 430 |
| Pour, ° F. | −40 |
| Color, NPA | 8— |
| Acid number | 24.7 |
| Saponification number | 25.0 |
| Nitrogen, percent | 0.71 |
| Sulfur, percent | 0.87 |

In order to illustrate the outstanding corrosion characteristics of the novel compounds of this invention, the inhibitors as prepared in the foregoing examples were blended with a mineral oil product such as diesel oil and subjected to a humidity cabinet corrosion test identified as the MIL-L-21260 type specification (Lubricating Oil, Internal Combustion Engine, Preservative). This test is carried out as follows: Small sand blasted mild steel panels are dipped in the petroleum distillate and then after draining two hours at room temperature are suspended in a highly humid atmosphere, generally about 100% humidity at 120° F., in a special cabinet and the time of initial corrosion of the panels is noted. The humidity cabinet is provided with heating units and thermal regulators for automatic temperature control. A water level of 8 inches is maintained in the bottom of the cabinet and eight linear feet per hour of clean air is bubbled through the water to assure high humidity at all times. The steel panels are suspended by stainless steel hooks around the periphery of the humidity cabinet. About three complete changes of air per hour are provided in the cabinet. In order to pass the test, no more than 3 rust spots 1 mm. in diameter should be observed on the panel after six days exposure in the cabinet.

A summary of the humidity cabinet results obtained when using the fatty diamine dicarboxylate disulfonate as a corrosion inhibitor in diesel fuel is shown below. The diesel fuel employed had an API gravity of 38.6, a boiling range of 378 to 640° F., and a SUS viscosity of 35.6 at 100° F. The effectiveness of the inhibitor compound of Examples II and IV as compared to the fatty diamine monocarboxylate-monosulfonate of Example I is considerably greater as revealed by the number of days the panels were exposed before failure occurred. At a concentration of 0.63% the reaction product of Example I gave good protection for twenty days whereas the fatty diamine monsulfonate monocarboxylate of Example I was substantially less effective, even at a higher concentration.

*Table I*

MIL-L-21260 HUMIDITY CABINET TEST RESULTS

| Inhibitor | Inhibitor Concentration, Wt. percent Dry Soap | Prepared As In Example | Average Number of Days Before Rusting* |
| --- | --- | --- | --- |
| Fatty Diamine Monocarboxylate-Monosulfonate | 0.72 | I | 6 |
| Fatty Diamine Monocarboxylate-Monosulfonate | 0.48 | I | 4 |
| Fatty Diamine Dicarboxylate-Disulfonate | 0.63 | II | 20 |
| Fatty Diamine Dicarboxylate-Disulfonate | 0.42 | II | 2.5 |
| Fatty Diamine Dicarboxylate-Disulfonate | 0.63 | IV | 11 |
| Fatty Diamine Dicarboxylate-Disulfonate | 0.42 | IV | 1 |

*Number of days before two or three rust spots 1 mm. in diameter appear on test panel.

The following data of Table II illustrate the results obtained when the compounds prepared in accordance with the present invention were tested in mineral oil products such as gasoline and diesel fuel for dynamic corrosion inhibition properties. The Dynamic Corrosion Test is a modification of ASTM test D-665-47T for rust-preventing characteristics of steam turbine oil in the presence of water and is useful for determining the protection afforded by corrosion inhibitors in dynamic systems, e.g. as in pipe lines. In this modified procedure, a freshly ground rust test coupon consisting of a ½-inch diameter by 5½ inches long mild steel rod is suspended in a 400 ml. beaker equipped with a stirrer and placed in a temperature controlled bath capable of maintaining the temperature at 100± 1° F. The test fuel (350 ml.) is added and stirred for thirty minutes to allow the rust inhibitor to precoat the test specimen. Part (50 ml.) of the test fuel is then removed and 30 cc. of distilled water is added, and the mixture stirred for a four-hour test period. At the end of this period, the coupon is removed, dried with suitable solvents, inspected and rated according to the following scale:

A—no rust
B++—trace of rust (covering a maximum of 0.25% of total surface area)
B+—0.25% to 5% of surface area covered by rust
B—5 to 25% or surface area covered by rust
C—25 to 50% of surface area covered by rust
D—50 to 75% of surface area covered by rust
E—75 to 100% of surface area covered by rust The test conditions are substantially more severe than ordinary conditions encountered so the results give a clear indication of the effectiveness and amount of the corrosion inhibitors required to obtain a rating of B++ or better. For comparison purposes Table II includes data illustrating the amount or minimum concentration of the fatty diamine mono- and dicarboxylate salts and fatty diamine sulfonate salts required to obtain a B++ or better rating.

*Table II*

| Inhibitor | Prepared As In Example | Dynamic test Results* | |
| --- | --- | --- | --- |
| | | Gasoline [1] | Diesel Fuel [2] |
| Fatty Diamine Monocarboxylate-Monosulfonate | I | 5.75 | 4.5 |
| Fatty Diamine Carboxylate Salt of Oleic Acid | | 45 | 12 |
| Fatty Diamine Sulfonate Salt of Petroleum Sulfonic Acids | | 5.6 | 4.9 |
| Fatty Diamine Dicarboxylate-Disulfonate | II | 2.1 | 1.67 |
| Fatty Diamine Dicarboxylate Salt of Dimerized Ricinoleic Acid | | 5 | 2 |
| Fatty Diamine Sulfonate Salt of Petroleum Sulfonic Acids | | 5.6 | 4.9 |
| Fatty Diamine Dicarboxylate-Disulfonate | III | 8.5 | 2.5 |
| Fatty Diamine Dicarboxylate Salt of Azelaic Acid | | 9.0 | 2.25 |
| Fatty Diamine Sulfonate Salt of Petroleum Sulfonic Acids | | 5.6 | 4.9 |

*Pounds of inhibitor (dry soap basis) needed per 1,000 barrels of hydrocarbon to obtain a B++ or better rating on the modified ASTM D-655 turbine rusting test.
[1] API gravity of 62.6; Reid Vapor Pressure 9.0; boiling range of 96 to 405° F.; ASTM Gum 2.7.
[2] See Table I.

The reaction products of Examples I, II and III were added to diesel fuel and tested in accordance with the following static test procedure. A flat strip of mild carbon steel (⅛" x ½" x 5⅞") is cleaned with naphtha or other solvent to remove grease and oil and then polished with emery cloth until no rust or pits remain. During these polishing operations and subsequently, the strip should be handled with a clean lintless cloth or a piece of Kleenex tissue. After the strip has been thus prepared, it should be carefully wiped free of emery dust. The specimen together with 90 ml. of the sample to be tested are placed in a corked four-ounce oil sample bottle which is allowed to lay on its side at room temperature for one hour. The liquid should cover the test specimen during this contact period. Then add 10 ml. of distilled water, cork tightly, and shake vigorously for three minutes to insure water wetting over the entire strip surface. The specimen should be tightly wedged between the cork and the bottom of the bottle to minimize breakage. The bottle is then restored to an upright position and allowed to stand at room temperature. The specimen is examined for rust daily; after each day the bottle is shaken again to replace water droplets on the specimen in the hydrocarbon phase that may have been disturbed during inspection. When 25% of the specimen area exposed in the aqueous phase becomes rusted the test has failed. The tests are run in quadruplicate and the average failure time measured in hours is reported. As shown below in Table III, the inhibitors prepared as in Examples II and III gave excellent corrosion protection as revealed by the passing of over 300 hours before 25% of the test coupon had rusted. Moreover, the inhibitors were employed in the amount necessary to obtain at least a B++ rating, and with identical amounts of fatty diamine carboxylate salts of oleic acid, dimerized ricinoleic acid or azelaic acid, striking differences in results were obtained which further illustrate the small amounts of inhibitor necessary to provide effective corrosion inhibition. This also is true when the inhibitors were compared with the fatty diamine sulfonate salts of sulfonic acids or the fatty diamine monocarboxylate-monosulfonate prepared from oleic acid. The significance of the static test shows the usefulness of the inhibitor in systems where the hydrocarbon stock does not flow past a metal surface, e.g. as in storage tanks, etc.

Table III

| Inhibitor | Prepared As In Example | Static Test Results | |
|---|---|---|---|
| | | Inhibitor Concentration [1] | Failure Time,[2] Diesel Fuel * |
| Fatty Diamine Monocarboxylate-Monosulfonate | I | 4.5 | 186 |
| Fatty Diamine Carboxylate Salt of Oleic Acid | | 4.5 | 60 |
| Fatty Diamine Sulfonate Salt of Petroleum Sulfonic Acids | | 4.5 | 20 |
| Fatty Diamine Dicarboxylate-Disulfonate | II | 1.67 | 312 |
| Fatty Diamine Dicarboxylate Salt of Dimerized Ricinoleic Acid | | 1.67 | 96 |
| Fatty Diamine Sulfonate Salt of Petroleum Sulfonic Acids | | 1.67 | 19 |
| Fatty Diamine Dicarboxylate-Disulfonate | III | 2.5 | 432 |
| Fatty Diamine Dicarboxylate Salt of Azelaic Acid | | 2.5 | 282 |
| Fatty Diamine Sulfonate Salt of Petroleum Sulfonic Acids | | 2.5 | 15 |

\* See Table I.
[1] Pounds per thousand barrels (dry soap basis).
[2] Hours before 25% of the area of coupon exposed to the aqueous phase has rusted.

This application is a division of application Serial No. 680,661, filed August 28, 1957, now U.S. Patent No. 3,025,240.

It is claimed:

1. A disulfonate selected from the formulae consisting of:

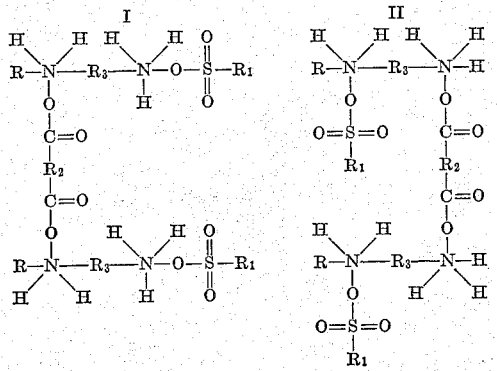

wherein R is a monovalent hydrocarbon radical having from about 6 to 22 carbon atoms; $R_1$ is an aromatic hydrocarbon radical of an aromatic sulfonic acid; $R_2$ is a divalent hydrocarbon radical derived from a dicarboxylic acid containing from about 0 to 35 carbon atoms; and $R_3$ represents a divalent aliphatic hydrocarbon radical containing from about 2 to 8 carbon atoms.

2. The compound of claim 1 wherein R is an aliphatic hydrocarbon radical derived from tallow fatty acids having about 16 to 18 carbon atoms and $R_3$ contains from 2 to 4 carbon atoms.

3. The compound of claim 2 wherein $R_1$ is the aromatic hydrocarbon radical present in mahogany sulfonic acid; $R_2$ is a hydrocarbon radical of a dicarboxylic acid selected from the group consisting of dimerized ricinoleic acid, azelaic acid and the propylene polymer adduct of succinic acid anhydride; and $R_3$ contains 3 carbon atoms.

References Cited in the file of this patent

UNITED STATES PATENTS 2,636,028    Sommer et al. _____ Apr. 21, 1953

UNITED STATES PATENT OFFICE
CERTIFICATE OF CORRECTION

Patent No. 3,153,070 October 13, 1964

David B. Sheldahl

It is hereby certified that error appears in the above numbered patent requiring correction and that the said Letters Patent should read as corrected below.

Column 2, lines 1 to 17, for the center portion of the formula reading:

column 5, line 44, for "28.7" read -- 23.7 --; column 8, Table II, second line of footnote, for "D-656" read -- D-665 --; column 10, line 27, for "35" read -- 36 --.

Signed and sealed this 27th day of April 1965.

(SEAL)
Attest:

ERNEST W. SWIDER
Attesting Officer

EDWARD J. BRENNER
Commissioner of Patents